United States Patent [19]

Faria

[11] Patent Number: 5,066,391
[45] Date of Patent: Nov. 19, 1991

[54] REUSABLE LIQUID FILTER ASSEMBLY

[76] Inventor: Manuel S. Faria, 13897 Road 144, Tipton, Calif. 93272

[21] Appl. No.: 570,902

[22] Filed: Aug. 22, 1990

[51] Int. Cl.⁵ ............................................. B01D 29/11
[52] U.S. Cl. ...................... 210/85; 210/130; 210/168; 210/416.4; 210/416.5; 210/419; 210/420; 210/429; 210/430; 210/431; 210/432; 210/435; 210/450; 210/453; 210/455; 210/DIG. 17; 123/196 A; 184/6.24
[58] Field of Search ............... 210/130, 168, 416.4, 210/416.5, 419, 420, 430, 431, 432, 435, 450, 453, 455, 85, DIG. 17, 437, 440, 441, 442, 443, 133, 429; 184/6.24; 123/196 A

[56] References Cited

U.S. PATENT DOCUMENTS

| | | | |
|---|---|---|---|
| 2,087,887 | 7/1937 | Gesner | 210/DIG. 17 |
| 3,036,711 | 5/1962 | Wilhelm | 210/130 |
| 3,265,213 | 8/1966 | Decker et al. | 210/136 |
| 3,773,180 | 9/1973 | Harrison | 210/DIG. 17 |
| 3,883,428 | 5/1975 | Waring | 210/94 |
| 4,222,875 | 9/1980 | Sikula | 210/429 |
| 4,536,290 | 8/1985 | Bonazzo | 210/419 |
| 4,622,136 | 11/1986 | Karcey | 210/168 |

Primary Examiner—Robert A. Dawson
Assistant Examiner—David Reifsnyder
Attorney, Agent, or Firm—St. Onge Steward Johnston & Reens

[57] ABSTRACT

A reusable liquid filter assembly having a housing having two internally threaded ends and two externally threaded removable end walls. Sealing O-rings are provided on the end walls to bear and seal against bevelled zones on the housing ends. A filter subassembly is positioned in the housing and centered therein by the end walls. A port is provided in one end wall for sampling the filtered liquid. The liquid filter is readily disassembled for cleaning and replacement of all of its components.

3 Claims, 3 Drawing Sheets

REUSABLE LIQUID FILTER ASSEMBLY

BACKGROUND OF THE INVENTION (1) Field of the Invention

The present invention relates to a reusable liquid filter assembly and more particularly to a reusable liquid filter assembly for filtering oil such as engine oil, cutting oils or hydraulic oils.

(2) Description of the Prior Art

Filter units for filtering liquid, such as engine oil are known in the art. An oil filter unit is typically placed in the oil line of an internal combustion engine to remove grit and other contaminants from the lubricating oil to provide longer engine life and improved engine performance.

The typical oil filter unit has a cannister or housing for coupling to the engine with a filter element therein for filtering the oil as it circulates through the cannister. The cannister ordinarily has one end adapted for coupling onto the engine block of the internal combustion engine by means of an internally threaded nipple that threads onto a corresponding externally threaded nipple or matching connecting configuration on the block. Oil inlet holes surround the nipple for receiving oil from the engine, and filtered oil is returned to the engine through the nipple. A gasket surrounds the inlet holes and the nipple to seal the unit against the block.

After the filter unit has been in the oil line for a certain period of operation, the gradual accumulation of grit and other contaminants in the filter element begins to reduce the efficiency and effectiveness of the filter unit and also provide increasing resistance to oil flow therethrough.

If the resistance to oil flow reaches a predetermined level, a pressure sensitive bypass valve is activated so that the oil bypasses the filter element and is returned essentially unfiltered to the engine. It is important for the operation and longevity of the engine that the filter unit be replaced or serviced before this valve is actuated and the engine is lubricated by unfiltered oil. However; were it not for the bypass valve, oil flow through the filter unit and likewise through the engine could cease if the filter were completely clogged with particulates.

Disposable or throw-away type oil filter units are known in the prior art. U.S. Pat. No. 3,265,213 to Decker et al. discloses such a filter unit. When the filter element has become clogged, the entire unit is removed and discarded, and a new unit is put in its place. This type of filter unit is relatively expensive in that a whole new unit must be used each time the filter unit is serviced, even though only the filter element itself has been expended and the other parts of the filter unit have not yet exceeded their useful life.

Also, with such a disposable filter unit, the filter element and bypass valve are sealed therein, and it is not easy to determine when the element has become clogged. It is possible for the filter to be completely expended after only 1,500 miles of engine operation, whereas the recommended procedure for the typical internal combustion engine calls for oil filter unit changes approximately only every 5,000 to 6,000 miles. It is also possible, due to faulty manufacturing or mishandling, for the bypass valve to become lodged in the "open" position even when the filter is new, thereby giving no oil filtering protection at all. Because the filter unit is completely sealed, it can be difficult to determine whether the bypass valve is operating properly.

An oil filter unit having a detachable cover permitting replacement of the filter element itself is known in the art. U.S. Pat. No. 3,036,711 to Wilhelm shows such a filter unit.

These prior art oil filter units are disadvantageous in that expense is increased, because the entire filter unit or the filter element itself must be periodically replaced with a new unit or element. Also, the flow of oil through the filter element may be restricted because of the manner in which the filter element is mounted inside the filter unit. It also may not be readily determinable by visual inspection whether the bypass valve is operating properly.

Furthermore, these oil filter units are typically manufactured to fit only one type or several limited types of engines. The nipples onto which these filters mount vary in diameter and thread size, and the available space for the filter may vary in size and shape. Such filter units are therefore not readily interchangeable between different internal combustion engines. Accordingly, a filter manufacturer must provide a variety of types and sizes of oil filter units to fit the various environments of use. It is to be appreciated that these prior art filter cannisters are generally drawn, and may require a different set of tooling for each size filter cannister.

Some of these disadvantages were overcome by the oil filter shown in U.S. Pat. No. 4,622,136 issued Nov. 11, 1986 to Karcey, the disclosure of which is hereby incorporated by reference in its entirety. The Karcey patent discloses a reusable liquid filter assembly having a housing with one end that is substantially closed except for a threaded outlet port, and one end that is removable to allow removal and cleaning of the filter element. It has been found however that the housing in the oil filter is difficult to clean when substantial deposits accumulate in the closed end of the housing. Further, it has been found that if only one filter length is available, the available space for locating such a filter may be smaller than the length of the filter, and it would be desirable to have a filter that can be made in different lengths without requiring a separate metal forming die for each filter length.

SUMMARY OF THE INVENTION

It is an object of the invention to provide a reusable filter assembly that permits easy access to and cleaning of the filter housing.

It is an object of the present invention to provide a reusable liquid filter assembly for an engine that can be operated at less expense than the typical prior art filter, in that the filter element can be removed, cleaned and reinserted in the filter unit for reuse a virtually unlimited number of times.

It is a further object of the present invention to provide a reusable liquid filter assembly that is adaptable for use on a plurality of engines having different shapes and sizes of coupling or connecting configuration requirements.

In accordance with the present invention, a reusable liquid filter assembly is provided for receiving liquid and discharging filtered liquid, the filter assembly comprising a housing which is open and threaded at both ends, a first removable end wall for threading together with the housing and having inlet and outlet ports, a second removable end wall for threading together with the housing and having a bleed port therein, filter means removably mounted inside the housing, means for holding the filter means inside the housing associated with the end walls, bypass valve means for providing a passageway between inlet and outlet ports when the liquid pressure exceeds a predetermined value, and gasket means for permitting the filter assembly to be sealed to a liquid system. The end walls are threaded, and are provided with 0-rings about their perimeters. The end walls thread matingly with the housing, with the 0-rings sealing against bevelled zones formed at the ends of the housing. The bleed port is provided for drawing off liquid specimens for inspection.

Further objects and details of the present invention can be seen from the accompanying drawings and detailed description of the preferred embodiment set forth below.

DETAILED DESCRIPTION OF THE PREFERRED EMBODIMENT

Although it is understood that the filter assembly of the present invention can be used for liquids other than oil and for engines other than internal combustion engines, the description of the preferred embodiment is in terms of an oil filter for an internal combustion engine.

Figure 1:
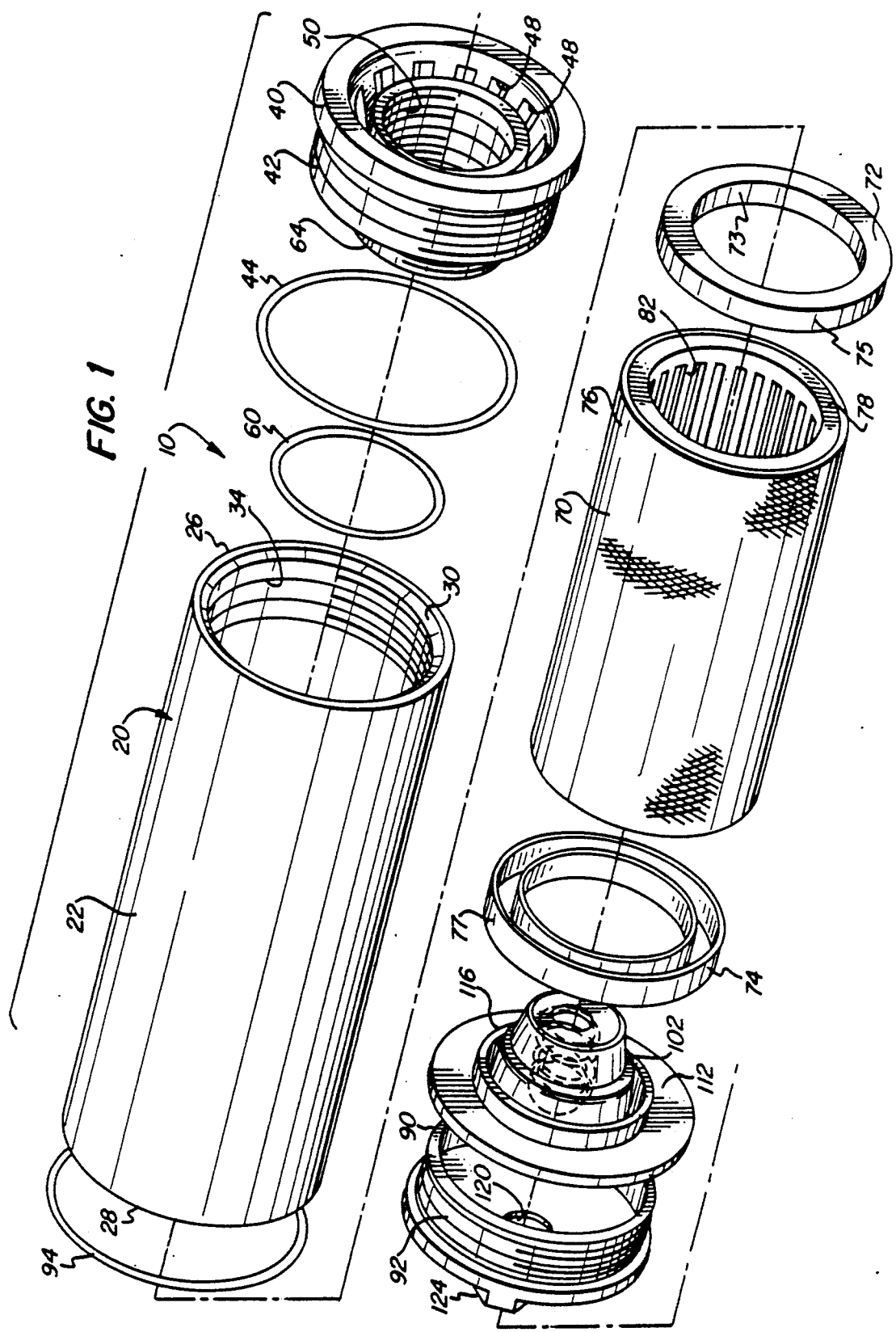
FIG. 1 is an exploded, perspective view of the reusable liquid filter assembly of the present invention.
Figure 2:
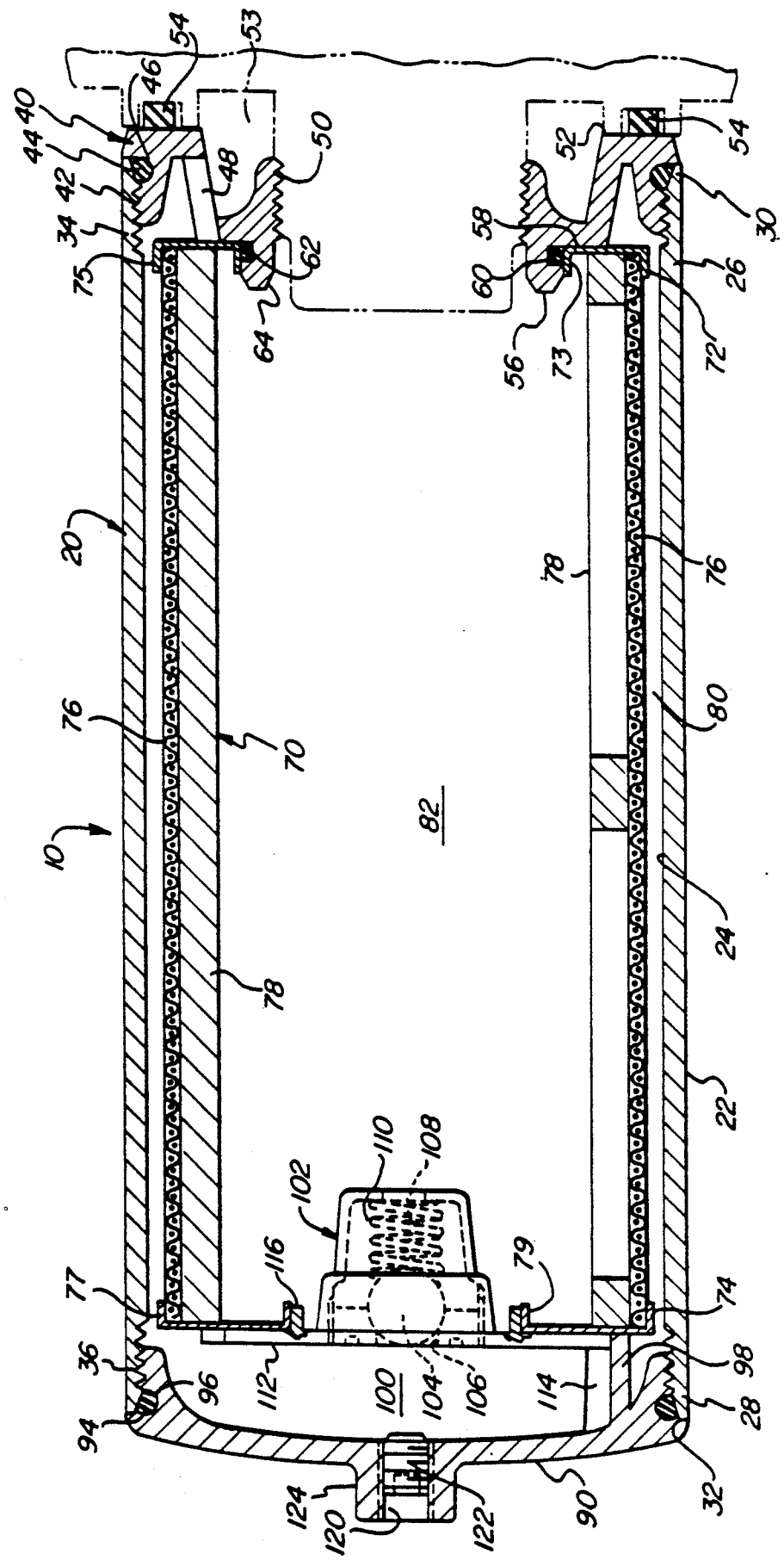
FIG. 2 is a cross-sectional view of the assembled reusable liquid filter assembly of the present invention.

Referring now to FIGS. 1 and 2, reference numeral 10 indicates generally the reusable oil filter assembly of the present invention. Filter assembly 10 comprises a housing 20 and a filter subassembly 70. Housing 20 has an outer side wall 22, and an inner side wall 24. Housing 20 has open ends 26 and 28 at each end thereof. Ends 26 and 28 are provided with bevelled zones 30 and 32 respectively at their ends, and are provided with internal threading 34 and 36 respectively adjacent the bevelled zones 30 and 32. Housing 20 is cylindrical with a longitudinal axis running therethrough, and the side walls 22 and 24 as shown in FIG. 1 are substantially cylindrical, although other shapes could also be used. The housing 20 preferably is of metal, such as aluminum or aluminum alloy, that is dimensionally stable and provides a substantially rigid enclosure for the filter components as described below. An appropriate plastic could also be used.

A first removable end wall 40 of housing 20 is adapted for mating with an engine block (shown in phantom outline in FIG. 2)or with another liquid containing system. Removable end wall 40 is provided with external threading 42 to mate with the internal threading 34 of end 26 of housing 20. Gasketing 0-ring 44 is provided in a channel 46 of end wall 40 to seal end wall 40 to housing 20 when they are threaded together.

The oil received from the engine enters filter unit 10 through a plurality of oil inlet ports or holes 48 formed in the end wall 40. The oil inlet ports 48 are shown spaced uniformly around a threaded outlet port 50 aligned with the longitudinal axis of housing 20. This outlet port 50 is centrally located and is for mounting the filter unit on the engine and for discharging filtered oil to the engine.

The outer face 52 of first end wall 40 abuts the engine block as shown in phantom outline in FIG. 2. Outer face 52 has a diameter of sufficient size to bridge and enclose with annular gasket 54 the connecting oil passages 53 leading from the engine to filter 10. Gasket 54 will preferably be seated in an annular gasket groove which surrounds the plurality of inlet ports 48 and the outlet port 52. The large gasket 54 makes the filter unit 10 usable on different sized engines, whereby outer face 52 is sealingly cooperable with a plurality of internal combustion engines. Preferably, gasket 54 has a square or rectangular cross-section.

Inner face 56 of first end wall 40 forms a shoulder 58 for supporting the filter subassembly 70. An 0-ring 60 is provided in a channel 62 formed in the central annulus 64 of inner face 56 to seal the inner face 56 to the filter subassembly 70.

Filter subassembly 70 comprises filter end caps 72 and 74, a filter sleeve 76, and a filter support frame 78.

Filter subassembly 70 is adapted for filtering the engine oil and removable mounting concentrically inside the housing 20. Filter assembly 70 divides the interior of housing 20 into two main parts. Filter assembly 70 forms an annular chamber 80 inside housing 20 in liquid communication with the plurality of oil inlet holes 48. Filter assembly 70 further forms a central cavity 82 in liquid communication with outlet port 50. Filter assembly 70 has a size predetermined by the size of housing 20 and is typically of sufficient length to extend from adjacent the inner face 23 56 end wall 40 to adjacent the second end wall 90, as set forth hereafter.

Filter sleeve 76 preferably comprises a flexible screen member having a plurality of openings or pores therein for permitting the flow of oil from annular chamber 80 to central cavity 82. The filter openings have a predetermined size so as to filter the oil by inhibiting the passage therethrough of grit, contaminants, and other foreign materials. Different screens having different size openings or pores can be used depending on the desired performance characteristics of the filter unit.

Filter sleeve 76 slidably abuts and is removably mounted on filter frame 78. Frame 78 is a substantially rigid cylindrical frame, which can be of any suitable material such as aluminum or aluminum alloy, molded plastic, or the like. Frame 78 is removably positioned concentrically within housing 20 to support sleeve 76 thereon. Frame 78 preferably forms a plurality of tapered lengthwise slots for enhancing the flow of oil through the filter sleeve 76 from annular chamber 80 into the central cavity 82. Each slot is tapered so that a large open area in the frame surface lies adjacent the filter sleeve 76 to reduce the resistance to oil flow through sleeve 76.

Sleeve 76 can be removed from the frame 78 by sliding and can be washed in an appropriate solvent to remove any accumulated grit or contaminants from the screen or sleeve 76. The sleeve 76 is then remounted or slid back onto frame 78. Alternatively, the entire screen and frame can be removed as a unit for cleaning.

As seen in FIG. 2, frame 78 is positioned concentrically inside housing 20 by the filter end caps 72 and 74. Filter end caps 72 and 74 are annular, and each have longitudinally inwardly extending rims. End cap 72 seats against shoulder 58 of end wall 40. End cap 72 is sized and has an inner rim 73 that centers end cap 72 on the central projecting annulus 64 of inner face 56, and fits and seals against 0-ring 60. Outer rim 75 of end cap 72 retains and centers one end of the filter subassembly 70. End cap 74 similarly has an outer rim 77 that retains and centers the other end of filter subassembly 70, and an inner rim 79 that seats on and is centered by an annular projection.

As shown in FIG. 2, the oil inlet holes 48 are formed in the end wall 40 parallel to the longitudinal axis of housing 20 and enter the outer chamber 80 adjacent the end of filter subassembly 70. Accordingly, as the oil enters the outer chamber 80 and flows past the screen 76, the inrushing oil has a tendency to flush the screen 76. The filter subassembly 70 has a predetermined diameter, whereby the frame portion adjacent the inner face 56 does not obstruct the inlet ports 48.

Referring now to FIGS. 1–4, a second removable end wall 90 has external threading 92 adapted to mate and screw together with internal threading 36 of end 28 of housing 20. 0-ring 94 is provided in a channel 96 in second end wall 90 to seal end wall 90 to housing 20 when they are threaded together. End wall 90 is provided with a plurality of struts 98 adapted to bear against filter end cap 74 to hold filter subassembly 70 in place when the oil filter assembly 10 is assembled. Preferably there are four such struts 98 which are separated from each other to permit flow of oil from chamber 80 to end chamber 100.

A bypass valve 102 provides an alternate path between the outer chamber 80 and cavity 82 when the screen 76 becomes clogged. Bypass valve 102 comprises a check ball and spring mechanism having a check ball 104 held against a valve seat 106 by a biasing spring 108. Ball 104 and spring 108 are held in place in a channel 110. The check ball and spring mechanism is responsive to the pressure of the oil entering through inlet ports 48 to provide a passageway from inlet ports 48 to the outlet port 50 when the oil pressure exceeds a predetermined value.

Figure 3:
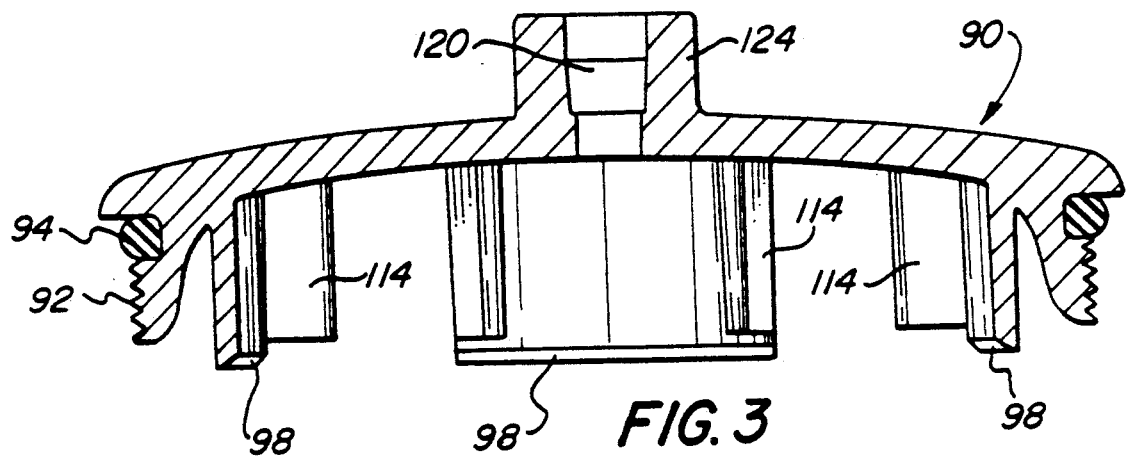
FIG. 3 is a cross-sectional view of a second removable end wall of the liquid filter assembly of FIG. 2.
Figure 4:
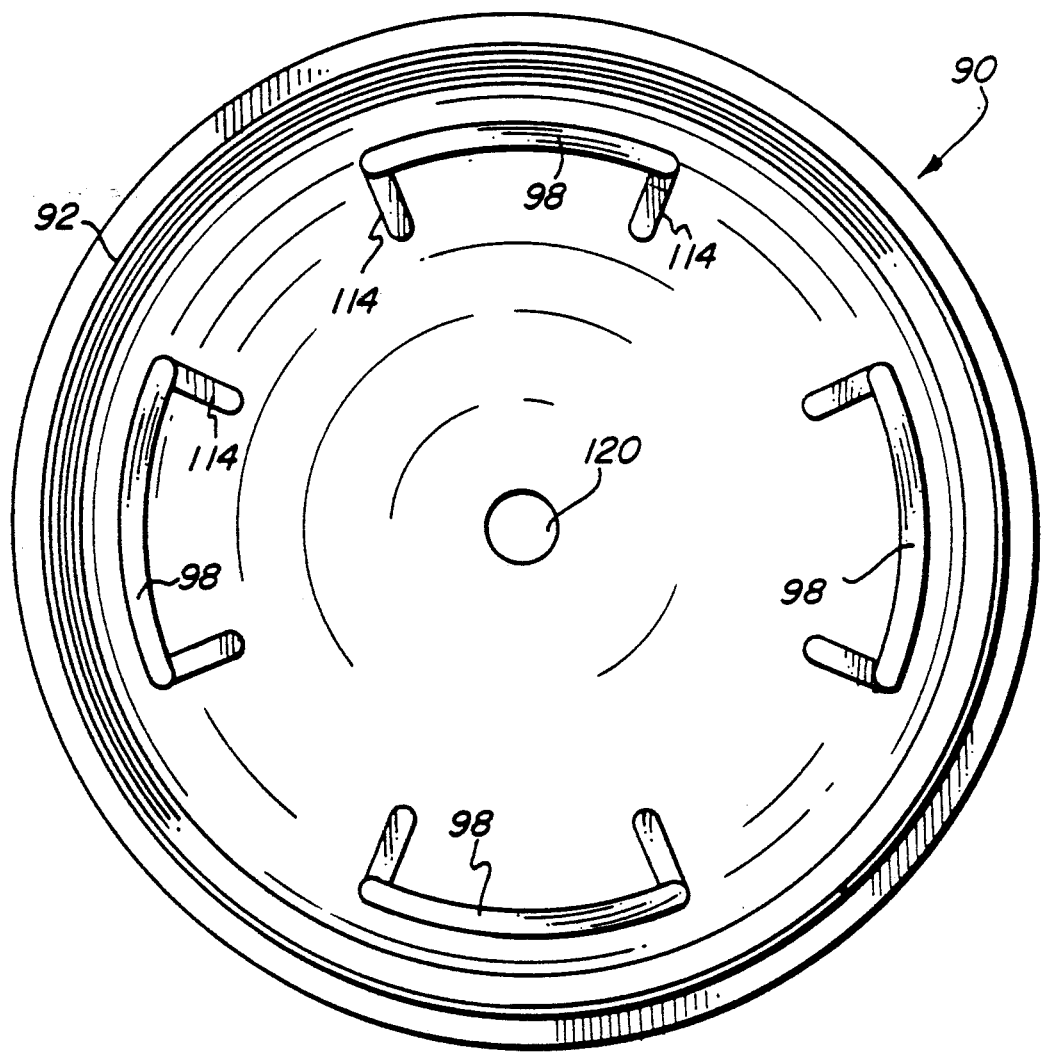
FIG. 4 is a bottom plan view of the end wall of FIG. 3.

The bypass valve 102 has a flange 112 for seating on filter end cap 74. Flange 112 is sized to snugly fit radially inwardly of the struts 98. Flange 112 is held in place by struts 114 that bear against flange 112 to hold the valve 102 in place when the filter assembly 10 is assembled. Struts 114 are thus preferably shorter in length than struts 98 by an amount about equal to the thickness of flange 112. As can be seen in FIGS. 3 and 4, struts 98 and 114 are preferably a unitary element, with struts 98 being crescent shaped to center flange 112, and struts 114 extending radially inwardly from struts 98 so as to bear against flange 112 when the filter 10 is assembled. An annular projection 116 extends inwardly from flange 112 to center and retain the inner rim 79 of filter end cap 74.

Second end wall 90 is provided with a port 120. Port 120 is preferably internally threaded. Port 120 may be plugged with a threaded plug 122 or if desired may be used to draw off the oil or other liquid for examination. Thus, for example, port 120 may be connected to a clear glass tube for visual inspection of the liquid. Port 120 may also be used to draw off accumulated particulates, or to add liquid to the system.

Port 120 is preferably provided in a projection 124, which is preferably hexagonal to receive wrench flats, so that end wall 90 may be easily unscrewed from housing 20.

Because end wall 90 can be easily removed by unscrewing, the bypass valve 102 can be removed for visual inspection to determine whether it is operating properly. By removing end wall 90 the valve 102 and filter subassembly 70 can be removed for cleaning and subsequent reinsertion. Similarly, end wall 40 may be removed by unscrewing, so that the housing 20 is open at both ends for cleaning.

If desired, a threaded insert means for insertion into the threaded nipple of outlet port 50 may be provided. Such an insert would have an internally threaded bore, whereby the size of outlet port 50 can be varied to be cooperable with a plurality of internal combustion engines. A number of different sized threaded inserts can be provided to make the filter unit 10 adaptable to be fitted to an even greater variety of internal combustion engines.

It is to be appreciated that the size of the filter assembly 10 may be varied to suit the environment of use. In particular, the housing 20 may be cut from aluminum pipe or other material to any desired length and the bevelled zones and threading subsequently applied. The end walls 40 and 90 and other components may then be assembled into the housing 20. The present invention thus provides an oil filter which can be sized for many different applications.

Although the filter assembly of the present invention has been described in terms of an oil filter unit, it is understood that the filter unit of the present invention can also be used to filter fuel, hydraulic fluid, or other liquids as well.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A reusable liquid filter assembly, comprising:
   a cylindrical housing having a diameter and open ends with bevelled zones adjacent said ends and having internal threading adjacent said bevelled zones;
   a first removable end wall having
      a cylindrical segment having an external thread for mating with the internal threading of one of said ends of said housing,
      an annular channel around the periphery of said cylindrical segment,
      a sealing ring for seating in said channel for sealing fit against said bevelled zone of said one end of said housing when said first end wall is threaded together with said housing,
      a central threaded outlet port extending through said end wall for discharging liquid,
      a plurality of inlet ports located radially about said outlet port and extending through said end wall for receiving liquid into said filter assembly,
      an annular projection for extending inwardly into said housing,
      a shoulder formed around said annular projection,
      a channel formed in said annular projection,
      another sealing ring for seating in said channel in said annular projection, and
      an annular gasket affixed to an outer surface of said first end wall;
   a second removable end wall having
      a cylindrical segment having an external thread for mating with the internal threading of the other of said ends of said housing,
      an annular channel around the periphery of said cylindrical segment of said second end wall, a sealing ring for seating in said channel for sealing fit against said bevelled zone of said other end of said housing when said second end wall is threaded together with said housing, a plurality of struts for extending inwardly into said housing when said second end wall is threaded together with said housing, and a closable port extending therethrough;

a filter subassembly having a cylindrical filter frame having a smaller diameter than the housing diameter and having slots therein, a filter screen for fitting onto said filter frame, and a first annular filter end cap for fitting over one end of said filter frame, said first filter end cap being provided with rims around inner and outer peripheral diameters of said first filter end cap, said first filter end cap having an inner diameter sized to be seated on said shoulder of said annular projection, with said inner rim sized for sealing fit against said other sealing ring seated in said channel in said annular projection of said first end wall, and said outer rim sized to snugly receive one end of said filter frame and filter screen;

a second annular filter end cap for fitting over the other end of said filter frame, said second filter end cap being provided with rims around inner and outer peripheral diameters of said second filter end cap, at least one of said struts of said second end wall being sized to press against said second annular filter end cap to retain said filter subassembly in said housing, said outer rim being sized to snugly receive another end of said filter frame and filter screen;

said filter subassembly defining an outer annular chamber between said housing and filter screen for containing liquid to be filtered and an inner chamber within said filter assembly for containing filtered liquid; and bypass valve means for connecting said inner and outer chambers and set to open at a predetermined pressure differential between said inner and outer chambers, said valve means having a flange, said flange having an annular projection for extending into said housing and centering said inner rim of said second filter end cap of said filter subassembly in said housing, said flange being centered in said housing and retained by said plurality of struts of said second end wall.

2. A reusable liquid filter assembly, comprising:

a cylindrical housing having a diameter and open ends and having internal threading adjacent said ends;

a first removable end wall having a cylindrical segment having an external thread for mating with the internal threading of one of said ends of said housing, an annular channel around the periphery of said cylindrical segment, a sealing ring for seating in said channel for sealing fit against said one end of said housing when said first end wall is threaded together with said housing, a central threaded outlet port extending through said end wall for discharging liquid, a plurality of inlet ports located radially about said outlet port and extending through said end wall for receiving liquid into said filter assembly, an annular projection for extending inwardly into said housing, a shoulder formed around said annular projection, a channel formed in said annular projection, another sealing ring for seating in said channel in said annular projection, and an annular gasket affixed to an outer surface of said first end wall;

a second removable end wall having a cylindrical segment having an external thread for mating with the internal threading of the other of said ends of said housing, an annular channel around the periphery of said cylindrical segment of said second end wall, a sealing ring for seating in said channel for sealing fit against said other end of said housing when said second end wall is threaded together with said housing, a plurality of struts for extending inwardly into said housing when said second end wall is threaded together with said housing;

a filter subassembly having a cylindrical filter frame having a smaller diameter than the housing diameter and having slots therein, a filter screen for fitting onto said filter frame, and a first annular filter end cap for fitting over one end of said filter frame, said first filter end cap being provided with rims around inner and outer peripheral diameters of said first filter end cap, said first filter end cap having an inner diameter sized to be seated on said shoulder of said annular projection, with said inner rim sized for sealing fit against said other sealing ring seated in said channel in said annular projection of said first end wall, and said outer rim sized to snugly receive one end of said filter frame and filter screen;

a second annular filter end cap for fitting over the other end of said filter frame, said second filter end cap being provided with rims around inner and outer peripheral diameters of said second filter end cap, at least one of said struts of said second end wall being sized to press against said second annular filter end cap to retain said filter subassembly in said housing, said outer rim being sized to snugly receive another end of said filter frame and filter screen;

said filter subassembly defining an outer annular chamber between said housing and filter screen for containing liquid to be filtered and an inner chamber within said filter assembly for containing filtered liquid; and bypass valve means for connecting said inner and outer chambers and set to open at a predetermined pressure differential between said inner and outer chambers, said valve means having a flange, said flange having an annular projection for extending into said housing and centering said inner rim of said second filter end cap of said filter subassembly in said housing, said flange being centered in said housing and retained by said plurality of struts of said second end wall.

3. A reusable liquid filter assembly in accordance with claim 2, further comprising a closable port extending through said second end wall.

* * * * *